(12) United States Patent
Kopyt (10) Patent No.: US 6,436,356 B1
(45) Date of Patent: Aug. 20, 2002

(54) APPARATUS FOR SELF-PROPAGATING HIGH TEMPERATURE SYNTHESIS

(75) Inventor: Yuri Kopyt, Ieeit (IL)

(73) Assignee: Comsyntech Ltd., Migdal Haemek (IL)

( * ) Notice: Subject to any disclaimer, the term of this patent is extended or adjusted under 35 U.S.C. 154(b) by 0 days.

(21) Appl. No.: 09/535,805

(22) Filed: Mar. 28, 2000

(51) Int. Cl.⁷ ............................ B01J 8/08; F28D 11/02
(52) U.S. Cl. .................. 422/233; 422/232; 422/198; 422/210
(58) Field of Search ................. 422/232, 233, 422/198, 209, 210; 110/185, 188, 193; 264/1.21, 603, 605, 652

(56) References Cited

U.S. PATENT DOCUMENTS

| 4,875,081 A | * 10/1989 | Goffe et al. ............... 399/343 |
| 5,178,844 A | 1/1993 | Carter |
| 5,252,264 A | * 10/1993 | Forderhase et al. ......... 264/497 |
| 5,308,232 A | 5/1994 | Merzhanov et al. .......... 425/79 |
| 5,730,072 A | * 3/1998 | Wright et al. ............... 110/345 |

FOREIGN PATENT DOCUMENTS

| RU | 874165 | 10/1981 |
| RU | 2054376 | 2/1996 |
| RU | 2054377 | 2/1996 |
| RU | 2069175 | 11/1996 |
| SU | 1770274 | 10/1992 |
| WO | WO 90/11857 | 10/1990 |

* cited by examiner

Primary Examiner—Jerry D. Johnson
Assistant Examiner—Alexa A. Doroshenk
(74) Attorney, Agent, or Firm—Blank Rome Comisky & McCauley LLP (57) ABSTRACT

The present invention relates to an apparatus for self-propagating high temperature synthesis of an inorganic compound from a combustible charge mixture of initial ingredients. The apparatus comprises mechanisms for continuously feeding the combustible charge into a reaction chamber and removing the synthesized compound therefrom. The apparatus also contains sensors to control and contain the combustion inside a combustion zone of the reaction chamber.

22 Claims, 10 Drawing Sheets

APPARATUS FOR SELF-PROPAGATING HIGH TEMPERATURE SYNTHESIS

FIELD OF THE INVENTION

The present invention relates mainly to powder metallurgy processing, more particularly to manufacturing of powders of various inorganic compounds by so called combustion synthesis or self-propagating high temperature synthesis. This method is well known and has been successfully employed for preparation of powders from ceramic and non ceramic compounds, e.g. cermets, composites, intermetallic compounds, complex salts, etc. The present invention refers primarily to a dedicated apparatus suitable for carrying out of such self-propagating high temperature synthesis.

BACKGROUND OF THE INVENTION

There are known numerous publications describing self-propagating high temperature synthesis. This process is based on inducing a high temperature self-sustaining combustion reaction within a mixture of initial components, required for synthesis of a compound, providing that upon mixing these components forms an exothermic system. By virtue of very high temperatures, accompanying the combustion reaction the compound is synthesized.

The method has been successfully employed for manufacturing of many compounds, including TiC, WC/TiC, TiC+Alumina, $Ti_5Si_3$, NiAl, TiN, $Fe_2O_3$, $LiNbO_3$.

There are known in the art various apparatuses designed for carrying out self-propagating high temperature synthesis. For the sake of brevity, these apparatuses will be referred-to further as SHS reactors and the combustion reaction will be referred-to as SHS reaction.

Most of the known in the art SHS reactors are designed to operate periodically. Typical examples of such reactors are disclosed in U.S. Pat. No. 5,178,844 or RU874165. The reactors disclosed in the above references comprise hermetically closed reaction vessel, provided with a cooling jacket. The SHS reactor disclosed in U.S. Pat. No. 5,178,844 comprises a reactor chamber divided into a combustion zone and a reaction zone.

A combustion mixture is injected into the combustion zone and is combusted therein. The reactor described in this reference is suitable for producing of silicon nitride.

Usually after the reaction chamber is filled with the charge mixture of initial components the reactor is vacuumized and the mixture is ignited to initiate the SHS process. Upon completing the process the reactor is cooled, the gases that were produced during the synthesis are evacuated therefrom and the charge in the form of smelted lumps is taken away. The charge is then comminuted to obtain the necessary powder size and powder size distribution.

Unfortunately, there exist fundamental disadvantages associated with the SHS reactors operating periodically. These reactors have relatively low capacity due to the necessity to periodically terminate the process for recharging the reactor.

Furthermore, the final product is not homogeneous due to significant temperature gradients accompanying the synthesis. Still further disadvantage is associated with the necessity in additional equipment and energy consumption required for comminuting.

The present invention, which will be described, further refers to a SHS reactors operating in a continuation mode.

The SHS reactors operating continuously are also known. An example of such SHS reactor is described in RU1770274. This reactor is equipped with a feeder provided with a rotating worm adapted to feed the charge from the feeder into combustion zone. For disintegrating of the smelted lump a dedicated rotating cutting disc is employed, which is mounted co-axially with the reactor exit.

Unfortunately, despite of substantial advantage achieved due to continuous mode of operation the construction of this reactor is associated with some substantial shortcomings. The combustion front is not prevented from expanding beyond the combustion zone up to the worm and feeder and this event can bring the reactor completely out of order or even destroy it. The reactor is not equipped with a means for preliminary heating of the charge and thus it cannot process low exothermic mixtures. The reactor is not provided with a means for advancing the smelted charge through the combustion zone.

The more advanced construction of a SHS reactor operating continuously is mentioned in WO90/11857 and RU2054376. This reactor comprises main rotor or drum adapted to receive the flow of reaction components, which are required for the synthesis of a compound. The flow fed from a feeder approaches the drum's periphery, deposits thereon in the form of a layer and is preheated thereon by a heat supplied to the main drum. Since the drum rotates the layer is continuously forwarded by drum's periphery toward the combustion zone where it is ignited.

The angular velocity of rotation is kept to ensure, that the combustion front propagates opposite to the flow. After the layer has passed the combustion zone and the compound is synthesized it is comminuted between the main drum and auxiliary roll, which is resiliently pressed to the main drum.

This reactor has been successfully employed for manufacturing of titanium carbide powder and titanium-tungsten carbide powder as disclosed in RU2054377, RU2069175. Nevertheless, the construction of this reactor is also associated with significant shortcomings.

The main shortcoming of the above reactor is its insufficient safety, since the reactor is not equipped with a means for monitoring the current position of the combustion front and detecting the event when the combustion front expands towards the feeder, for example due to breakdown of the drum drive or due to electricity supply breakdown. Besides, since the drum cooling system is not provided with a temperature control the charge within the feeder is not prevented from inflammation.

Furthermore, since the axes of rotation of the main and auxiliary drum lay within the same horizontal plane the charge flow can slope down from the drum's periphery. This may be associated with insufficient reliability of operation due to possibility for discontinuation of the flow and terminating of the self-sustaining combustion.

The final product synthesized in this reactor is not pure, since the charge is not prevented from entering into receptacle for collecting the ready product and therefore it can be contaminated.

The capacity of this reactor is relatively low, since it is not equipped with a mechanism for densification of the charge and thus the charge can be easily expelled from the combustion zone and lost.

The assortment of compounds, which can be synthesized in this reactor is limited, since it is not suitable neither for processing of low exothermic charges and compounds requiring to use reactant gas, e.g. Nitrogen, Oxygen etc., nor for processing under vacuum.

In conclusion it should be emphasized that despite the fact that different SHS reactors have been devised there is still exists a need to provide a new and improved reactor, which will enable carrying out the SHS synthesis safely, efficiently and economically.

OBJECTS OF THE INVENTION

The object of the present invention is to provide a new and improved SHS reactor, operating continuously and enabling sufficiently reduce or overcome the above-mentioned drawbacks of the known in the art SHS reactors.

In particular, the main object of the present invention is to provide a new and improved SHS reactor in which the combustion front is prevented from expanding beyond the combustion zone and thus the combustion synthesis can be carried out safely.

The further object of the present invention is to provide a new and inexpensive SHS reactor in which the charge flow is continuous and does not disengage the combustion front and thus the combustion synthesis is carried out reliably.

The third object of the present invention is to provide a new and improved SHS reactor, in which the final product is not contaminated.

Still further object of the invention is to provide a new and versatile SHS reactor, which operates automatically and which is capable to process various charges either in the presence of gases or under vacuum.

The above and other objects and advantages of the SHS reactor of the present invention can be achieved in accordance with the following combination of its essential features, referring to different embodiments thereof.

According to one of the preferred embodiments, the apparatus of the invention comprises the following main components i) a feeding receptacle for storing the charge therein, said feeding receptacle being in communication with ii) a closed reactor chamber, configured as hot-insulated cylindrical housing provided with
   an inlet opening for entering the charge mixture thereinto,
   a combustion zone provided with igniting means for igniting the charge Mixture to establish self-sustaining combustion reaction between the ingredients,
   an outlet opening for discharging of the synthesized compound from the housing,
   said reactor chamber is provided with a forwarding means, residing within the housing and driven by a drive, said forwarding means is capable to advance continuously the charge mixture towards the combustion zone and to draw the charge mixture therethrough, said forwarding means is located within the housing in such a manner, that the charge mixture deposits thereon substantially as a layer displaceable by the forwarding means, iii) a monitoring means capable to monitor the current location of the combustion front established during said combustion reaction and to detect when said combustion front expands beyond the combustion zone, iv) an extinguishing means capable to terminate the combustion reaction substantially automatically when the combustion front expands beyond the combustion zone, v) a retaining means capable to prevent the said layer from separating from the cylindrical periphery surface of the main drum, vi) a comminuting means capable to disintegrate the smelted layer after it has passed the combustion zone and to convert it into particulate synthesized compound, vii) an instrumentation and control means required for running the apparatus.

In the further embodiments, said apparatus is provided with various additional components, enabling achieving the above objects of the invention.

Among these components can be mentioned a compacting means capable to compact the said layer before it enters the combustion zone, a scraping means for separation of the smelted layer from the forwarding means, a heating means for heating at least part of the forwarding means, before the charge resides thereonto, a heating means for heating the charge before it enters the housing, a gas supply means for supplying of at least one gas reactant as required for synthesizing the compound and with a means for evacuation and filtering of the residual gas products generated during the combustion reaction, a blowing means for cleaning the interior of the reactor chamber by blowing therethrough of a cleaning gas, a vacuum means for vacuumization the reactor chamber, at least one window for visual observation of the chamber interior, a de-contamination means for preventing contamination of the synthesized compound by the charge mixture, which did not undergo the combustion reaction.

The present invention in its various embodiments has only been summarized briefly. For better understanding of the present invention as well of its advantages, reference will now be made to the following description of its embodiments with reference to the accompanying drawings.

BRIEF DESCRIPTION OF THE DRAWINGS

FIGS. 8a, b is correspondingly a partial side view of a comminuting means and its cross-sectional view taken along C'—C'.

FIGS. 9a,b show schematically a system for charging and discharging of the reactor of the present invention.

DETAILED DESCRIPTION OF SPECIFIC EMBODIMENTS

Figure 1:
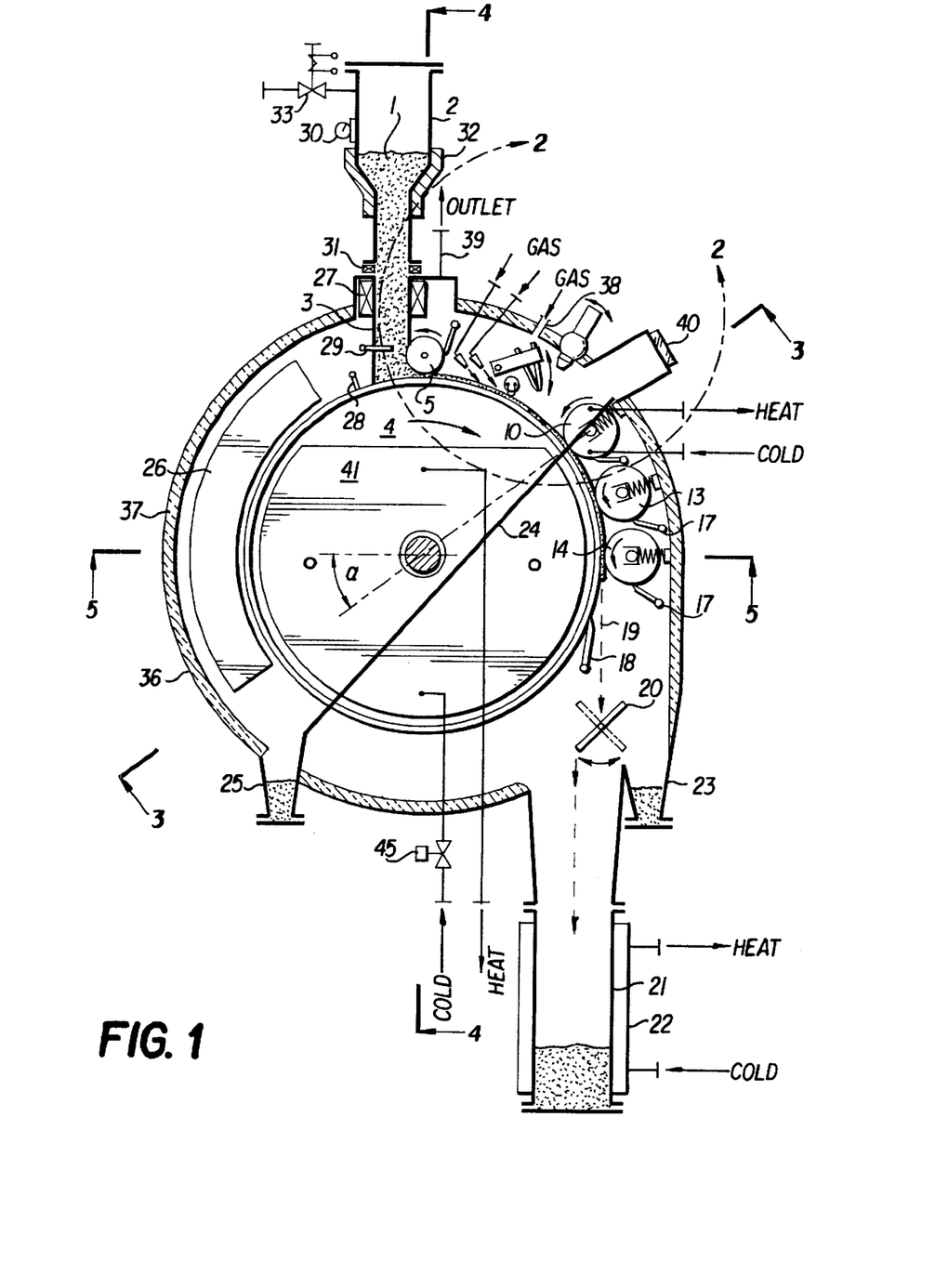
FIG. 1 is a side cross-sectional view of the SHS reactor of the present invention.

With reference to FIG. 1 the main component of the apparatus in accordance with the main preferred will be described. A charge mixture 1 of initial ingredients, which are required for synthesizing the compound is placed within a feeding receptacle 2 situated above the reaction chamber and from which they can follow via a discharge conduit 3 towards the peripheral cylindrical surface of a main drum 4, situated within the reaction chamber. Since the main drum rotates the charge mixture deposits on the drum's surface as a layer, which is forwarded continuously by the drum's peripheral surface towards the combustion zone. Here the charge mixture is ignited and self-propagating self-sustaining combustion reaction establishes. This reaction results in converting the charge mixture into synthesized compound.

It is advantageous if a compacting roller 5 is mounted at the exit of the feeding conduit 3 and is separated by at certain distance from the drum's peripheral surface. Since the roller rotates opposite to the main drum it exerts pressure on the charge mixture, which enters within the space between the peripheral surface of the drum and the roller. By virtue of the roller, the charge mixture as a layer 6 is compacted before it approaches the combustion zone 7. A distance $\Delta$ between the roller and the drum defines the thickness of the layer. Mounted within the combustion zone an igniter 8 ensures ignition of the charge mixture once the igniter contacts the layer. As suitable igniter, one can use for example a couple of carbon electrodes, connected to a source of energy.

The linear velocity of the drum is monitored by a monitoring means 9 and it is maintained in concert with the rate of the combustion reaction. If the combustion rate diminishes or increases, the linear velocity of the main drum 4 is correspondingly increased or reduced.

Mounted beyond the combustion zone and slightly above the drum's peripheral surface a roller 10 is provided. This roller prevents the layer from sloping down due to gravitation and thus prevents its separation from the drum. It can be appreciated that by virtue of this provision the material flow, which approaches the combustion zone retains continuous and therefore combustion reaction is not interrupted.

In practice the roller is mounted in such a manner, that an angle $\alpha$ between a horizontal plane and the plane passing through the centers of the drum and the roller lies between 25–30 degrees. The distance $\Delta_1$ between the drum and the roller 10 should be kept 0.6–0.95 of the layer thickness. In practice roller 10 is resiliently pressed towards the drum for example by a spring 11 to render the distance between the roller and the drum self-adjusting.

After the charge mixture has passed the combustion zone and became a ready product it is disintegrated. For this purpose there is provided a couple of comminuting wheels 13,14, made of a material with hardness preferably exceeding that of the synthesized compound. The wheels are mounted above the drum with possibility for rotation with speed, which differs from that of the drum. The wheels are resiliently pressed towards the drum to exert some pressure on the smelted layer of the synthesized compound while it passes between the wheels and the drum. In practice the amount of comminuting wheels depends on the properties of the particular synthesized compound to be disintegrated.

A group of dedicated scrapers 15–18 is provided for cleaning respectively the peripheral surfaces of the main drum, rollers 5, 10 and wheels 13,14.

A powder 19 of disintegrated synthesized compound passes a butterfly selector valve 20, which is put in a position shown by solid lines. In this position, the valve directs the ready product into a collecting receptacle 21. In this receptacle, a cooling jacket 22 cools the ready product. In the beginning of the combustion run when the charge mixture still did not undergo the combustion, the selector valve is put in a position shown by dotted lines to direct the charge mixture towards a reject collecting receptacle 23. It can be easily appreciated, that by virtue of this provision the contamination of the ready product is avoided. After the initial period is completed and appropriate working conditions are established the selector valve is put again in the position shown by solid lines.

A tray 24 is provided for entrapping of hard particles expelled from the combustion zone. This tray is in communication with a dedicated receptacle 25, in which the hard particles are collected.

A dedicated heaters 26 and 27 are provided to heat respectively the drum and the feeding conduit. As seen in FIG. 1 the heater 26 is mounted within the reactor chamber and heats the drum's cylindrical peripheral surface, before it approaches the feeding conduit. The heater 27 is mounted around the feeding conduit to heat the charge mixture before it approaches the drum. Respective temperature sensors 28,29 can control the heating temperature.

It is of advantage if receptacle 2 is provided with a vibrating means 30, amortization means 31, dedicated heating means 32 and control valve 33. By virtue of vibrating means and amortization means, the feeding receptacle is prevented from clogging by the charge mixture. By virtue of heating means 32 the charge mixture is dried and moisture is evacuated therefrom. Control valve 33 ensures vapor and air evacuation in the beginning of the run or when a neutral gas or reactant gas fills the chamber.

Figure 2:
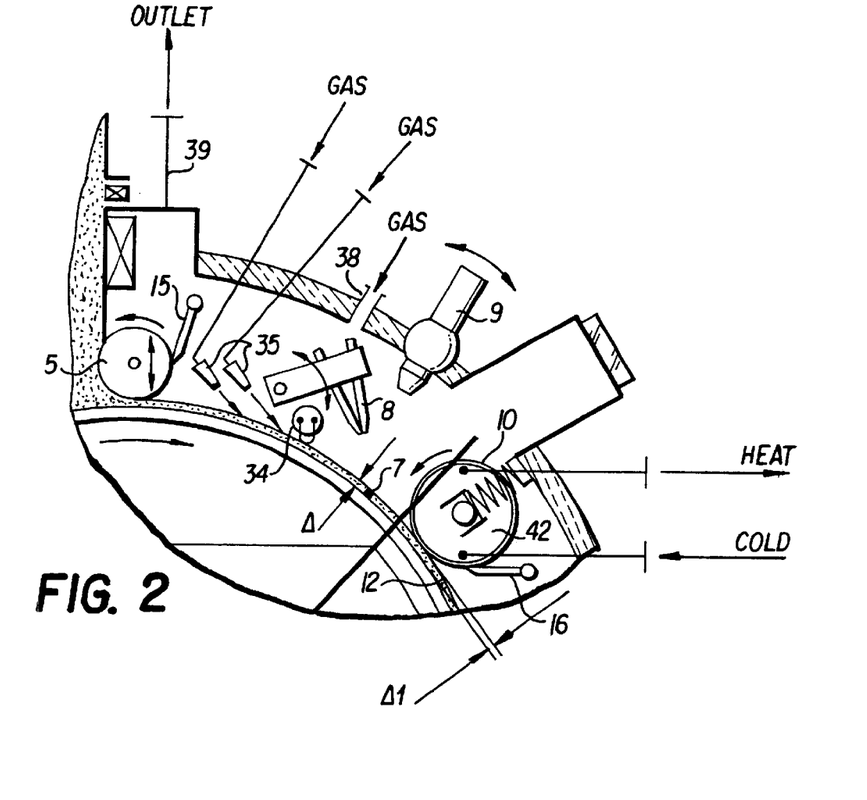
FIG. 2 presents enlarged fragment I of the FIG. 1.

With reference to FIGS. 1,2 an extinguishing system is shown. This system comprises a sensor 34 for monitoring the current position of the combustion front and a couple of nozzles 35 connected to a source of pressurized gas, capable to terminate the combustion reaction in the case of emergency.

A housing wall 36, provided with a heat-insulating layer 37, hermetically closes the reactor chamber. An inlet port 38 is provided within the housing wall for supplying therethrough either a neutral gas, or a reactant gas, or vacuum and with an outlet port 39 for evacuation of that gas product, which are formed during the combustion synthesis.

At least one window 40 can be provided within the housing wall for visual observation of the interior of the chamber and of the combustion reaction.

Figure 3:
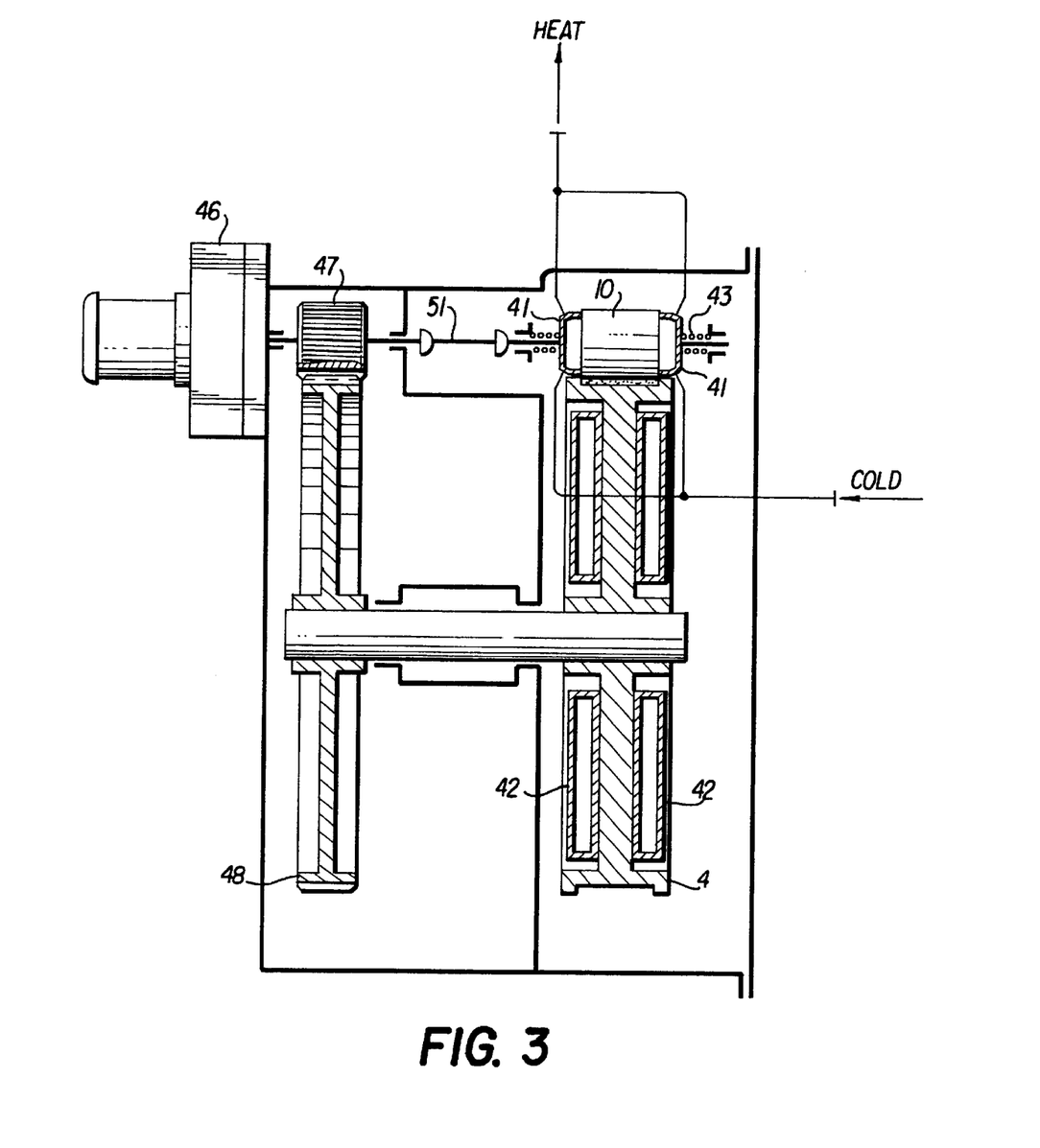
FIG. 3 is a cross-sectional view of the FIG. 1 taken along A—A.
Figure 4:
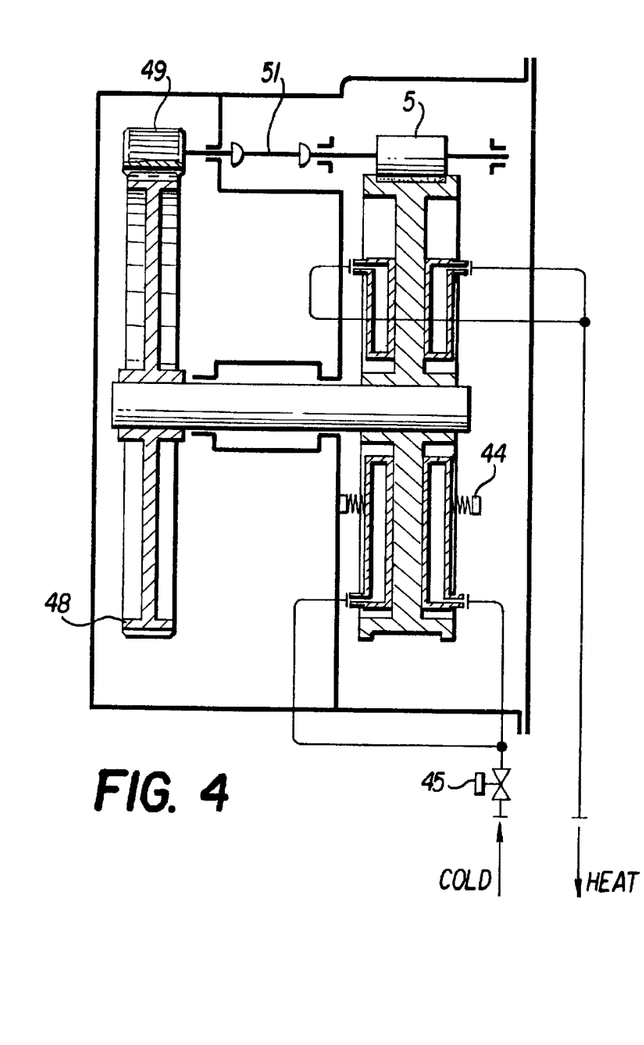
FIG. 4 is a cross-sectional view of the FIG. 1 taken along B—B.

Referring now to FIGS. 3,4 it is shown that the excessive heat from the drum and roller 13 is evacuated by a dedicated cooling jackets 41,42, through which a cooling agent, e.g. water continuously flows. These jackets are pressed respectively to the drum and to the roller by respective spring 43,44.

A control valve 45 adjusts the flow rate of the cooling agent. It should be understood that alternative cooling means can be used for the same purpose, e.g. the cooling agent can be supplied immediate within the interior of the drum and the roller.

Figure 5:
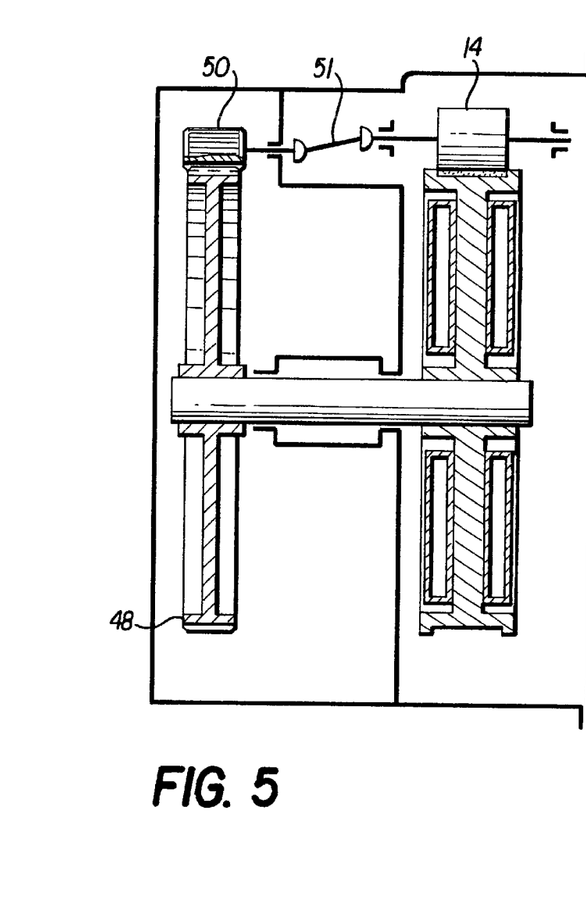
FIG. 5 is a cross-sectional view of the FIG. 1 taken along C—C.

Referring now to FIGS. 3,4 and 5 it is seen, that the main drum, rollers 5,10 and comminuting wheels 13,14 are driven by a mutual drive 46 via a dedicated toothed wheels 47,48, 49,50. The outside diameters of the toothed wheels are chosen to ensure, that the drum and rollers 5,10 rotate with the same linear velocity. At the same time, linear velocity of the comminuting wheels exceeds that of the drum. In order to control the distance between the drum's peripheral surface, rollers 5,10 and wheels 13,14 a compensator means 51 is provided. As suitable compensator means one can employ a universal joint or any other appropriate kinematical means.

Figure 6:
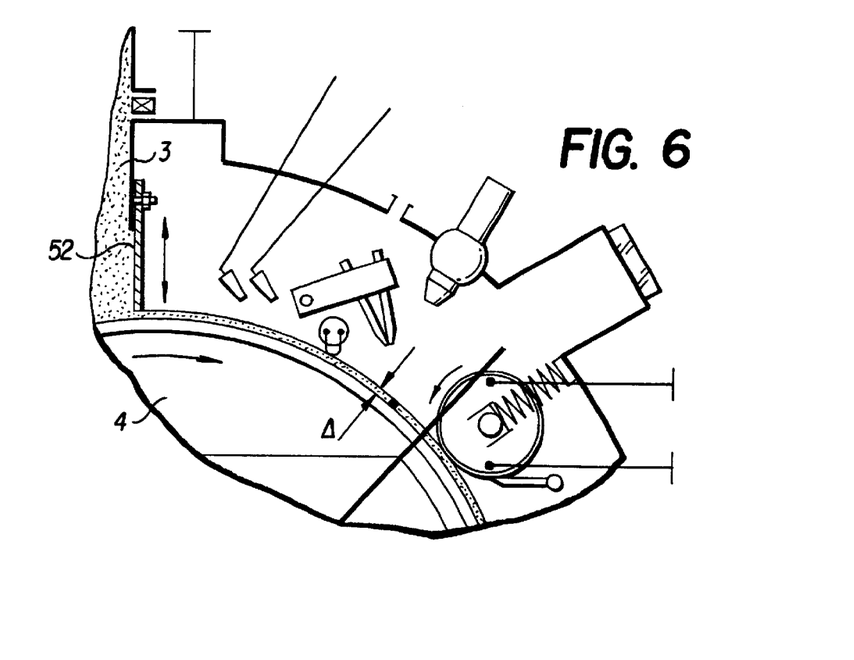
FIG. 6 shows fragment I when a reactant gas is employed for the synthesis.

In order to enable synthesizing of compounds, which require a reactant gas, e.g. Nitrogen, Oxygen, etc., the charge should not be compacted since the gas should approach solid ingredient. Thus, instead of compacting roller 5 a sliding shield 52 can be used, as shown in FIG. 6. By slide displacement of the shield up or down the charge layer thickness Δ can be adjusted for the most optimal conditions of the synthesis.

Figure 7:
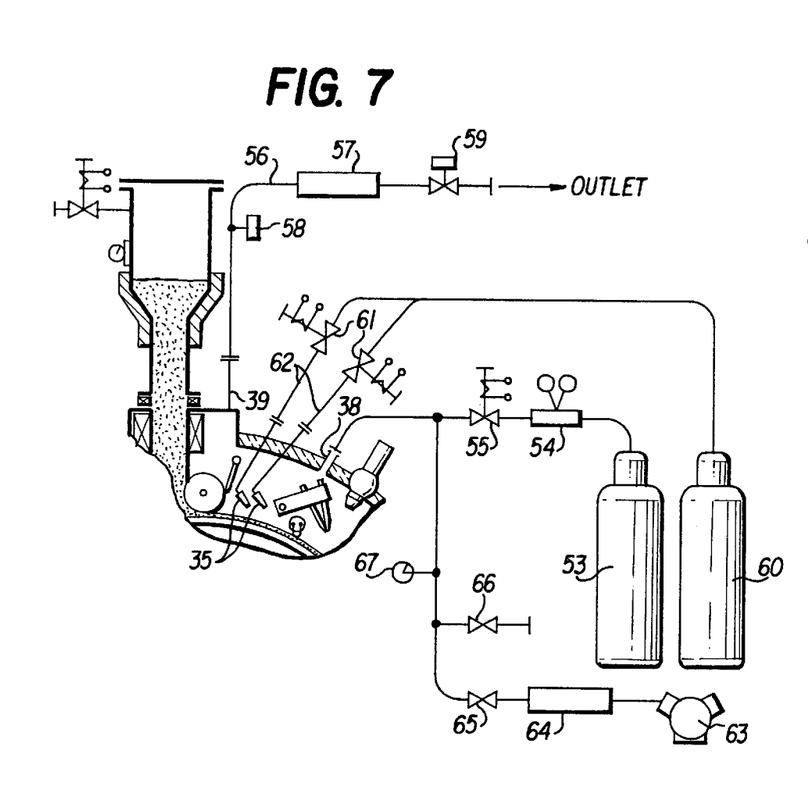
FIG. 7 is a system for supply and evacuation of gases and vacuum.

Referring now to FIG. 7 it will be explained how various gases or vacuum could be supplied to the reactor chamber and how gases formed during the combustion reaction can be evacuated therefrom.

Neutral gas, for example Argon or reactant gas is supplied to the chamber via the inlet port 38 from a source 53 via a reduction valve 54, which controls the pressure within the chamber and a valve 55. For evacuation of gases from the chamber, the outlet port 39 is used. The gases pass a duct 56, a filter means 57 and then proceed to the atmosphere. In those cases when a reactant gas is used the duct 56 is provided with a pressure sensor 58 and a proportional control valve 59 to ensure the required level of the reactant gas pressure within the chamber. Filter means 57 collects solid particles and neutralizes the toxic components of the evacuating gas. As suitable filter means one can use cyclones, bag filters, electrostatic precipitators, inertial filters, etc. For neutralizing the toxic components, one can use catalysts or bubbling through water, through special solution, etc.

The extinguishing system consists of a source 60 of pressurized inert gas, e.g. Argon, control valves 61 and ducts 62, connected to the inject nozzles 35.

The reactor chamber can be kept under vacuum by virtue of a system, consisting of a vacuum pump 63, cooled by a cooler 64. The pump is connected to the chamber through a valve 65 and to the atmosphere through a valve 66. A gauge 67 for measuring the vacuum is provided.

When the chamber should be kept under vacuum the valve 59 is closed to cut the interior of the chamber from the atmosphere.

Figures 8A, 8B:
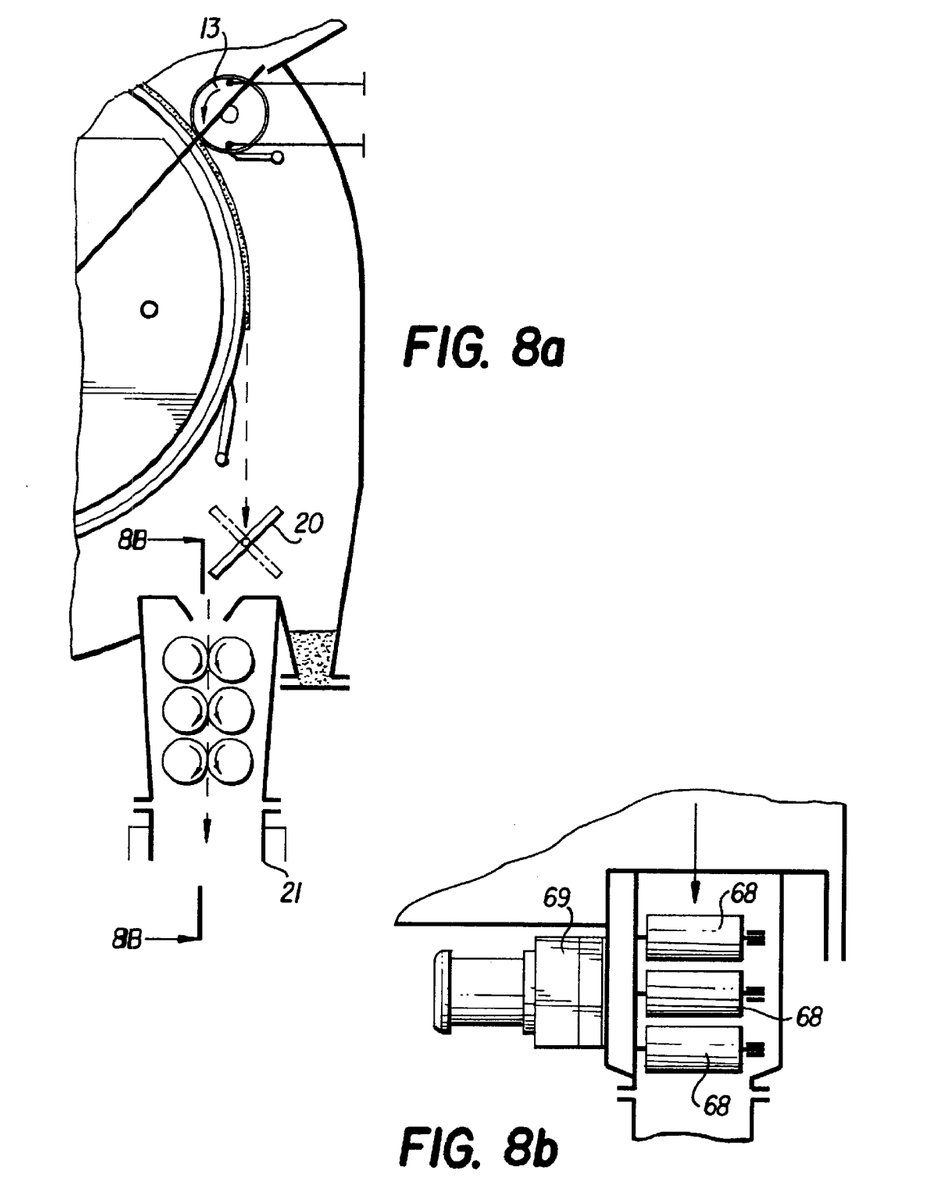

In order to reduce wear of the drum one can use alternative comminuting means as shown in FIGS. 8a,b. This means comprises plurality of rollers 68 driven by a dedicated drive 69. In this embodiment, the comminuting means is mounted in the reactor chamber between the valve 20 and the receptacle 21.

It can be realized, that by virtue of the above described apparatus it is possible to keep the combustion reaction continuously all the time as the charge mixture is fed from the feeding receptacle 2 to the combustion zone. In this situation, the volume of receptacle 2 and 21 should be sufficient for operating the apparatus during at least one shift.

Figures 9A, 9B:
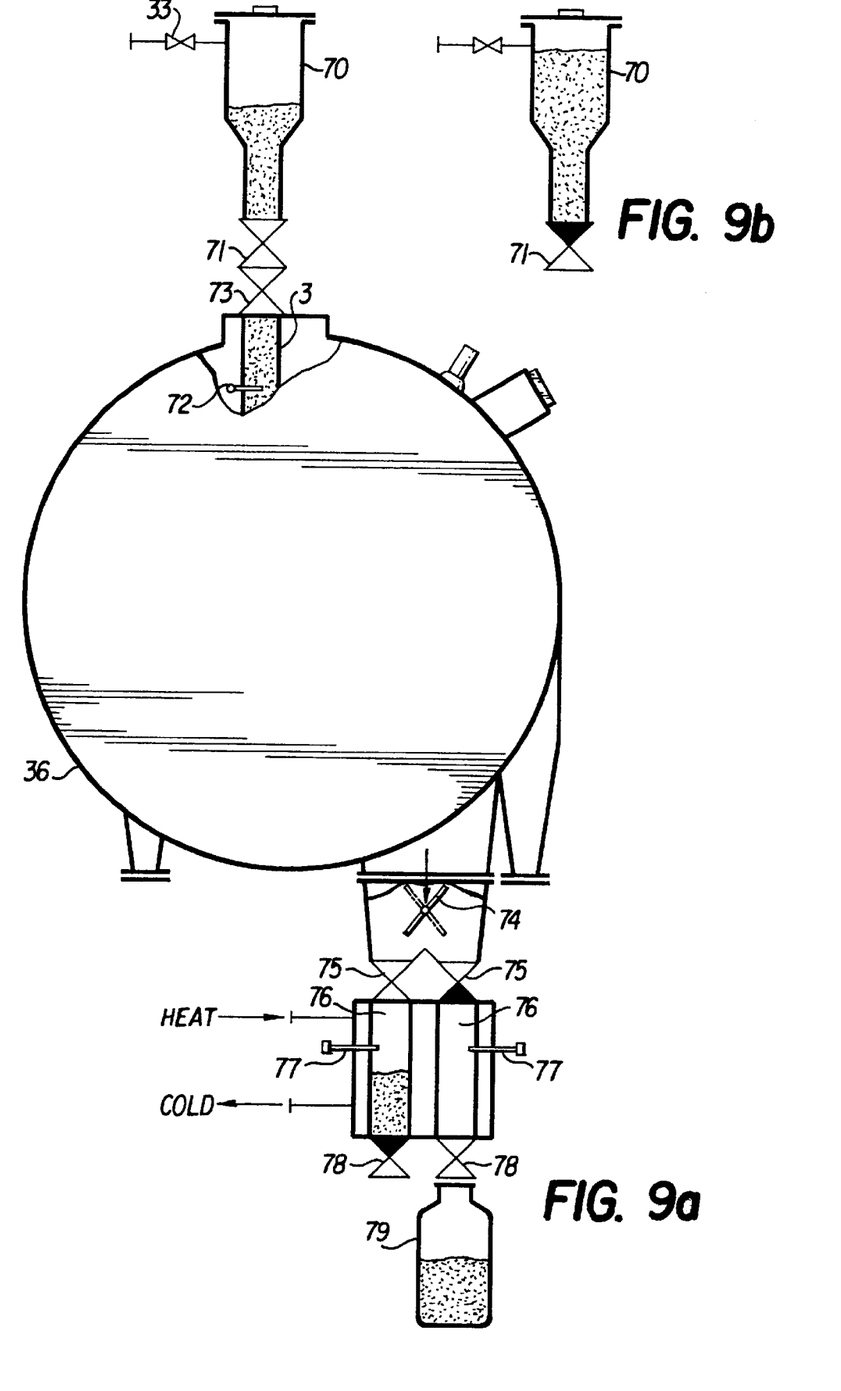

To keep the combustion reaction during longer period of time the apparatus should be equipped with a means for periodical replenishment of the charge mixture in the feeding receptacle and discharging the ready synthesized product from the collecting receptacle. One of the embodiments suitable for this purpose is presented in FIG. 9. This embodiment comprises a dedicated recharge silo 70 provided with a discharge valve 71. The silo is mounted above the feeding conduit to be in communication therewith. Mounted within the feeding conduit a sensor 72 measures the current level of the charge mixture. Installed under the discharge valve 71 a valve 73 ensures, that the interior of the reactor chamber is not in communication with the atmosphere during replacement of the recharge silo.

Mounted in the discharge region of the apparatus a butterfly selector valve 74 is provided. This valve is connected through a couple of valve means 75 to a double chamber receptacle 76. By virtue of this selector the flow of synthesized compound can be directed either to the right or left chamber of the double chamber receptacle. Mounted within each chamber a dedicated sensor 77 is provided for measuring the level of the product within the respective chamber. The chambers are connected through a dedicated valve means 78 to a replaceable container means 79 for collecting the ready product. As suitable valve means one can use ball valves, hermetical sliding gates etc.

The charging procedure is carried out as follows. After the recharge silo 70 is emptied completely and the feeding receptacle is emptied in some extent, the sensor 72 generates a signal, which advises about the necessity to replace the silo. After the valves 71, 73 have been closed the silo is disconnected from the reactor chamber and proceeds to the position, where a new portion of the charge mixture is fed thereinto (not shown). Instead of the empty silo a new, already filled silo is brought, and upon connecting thereof to the reactor chamber, valves 71,73 open to enable the charge mixture to enter in the feeding conduit. The particular location of the sensor 72 within the conduit is chosen in such a manner, that the amount of the charge mixture, which still remains in the conduit is always sufficient to fill the chamber while the silo is being replaced.

The discharging procedure is carried out as follows. The butterfly selector valve is put to direct the ready product in one of the chambers 76, say in the left chamber if the right chamber is full. Valve 75 opens, valve 78 closes and the left chamber is being filled. To discharge the right chamber it is connected to the container means 79 and valve 78 opens. After the interior of the right chamber is emptied the valve 78 should be closed and valve 75 opened to enable disconnecting of the container means from the right chamber. As soon as the product level in the left chamber approaches the sensor 77 it generates a signal, switching the position of the selector valve 74 to direct the ready product in the right chamber. The left chamber should be connected now to the container means and once valve 75 closes and valve 78 opens the ready product proceeds from the left chamber to the container means.

The above steps are repeated as long as the run continues.

Now with reference to FIGS. 10, 11 two alternative embodiments of the apparatus will be described. In contrast to the previous embodiment in these alternative embodiments the forwarding means, responsible for continuous displacing of the charge mixture to the combustion zone and to the discharge zone is formed not as a drum, but either as a rotating disk table or as a conveyor.

Figures 10A, 10B:
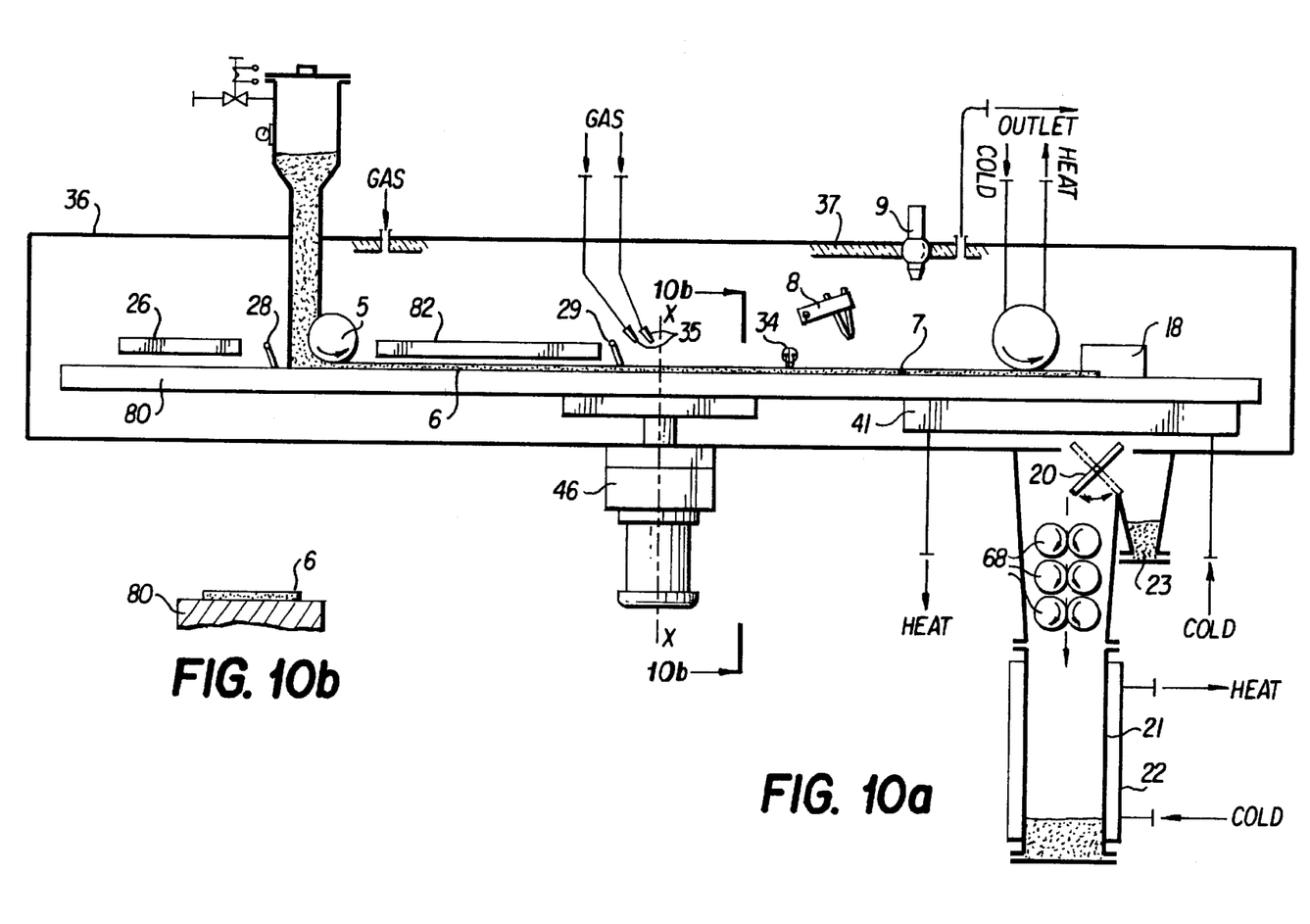
FIG. 10 refers to an embodiment of the SHS reactor employing a disk table instead of a drum.

As best seen in FIG. 10 a disk table 80 is mounted in the reactor chamber with possibility for continuous rotation about vertical axis X—X. The charge mixture exits from the feeding conduit, approaches the table and deposits thereon as a layer, which is advanced thereby when the table rotates.

Figures 11A, 11B:
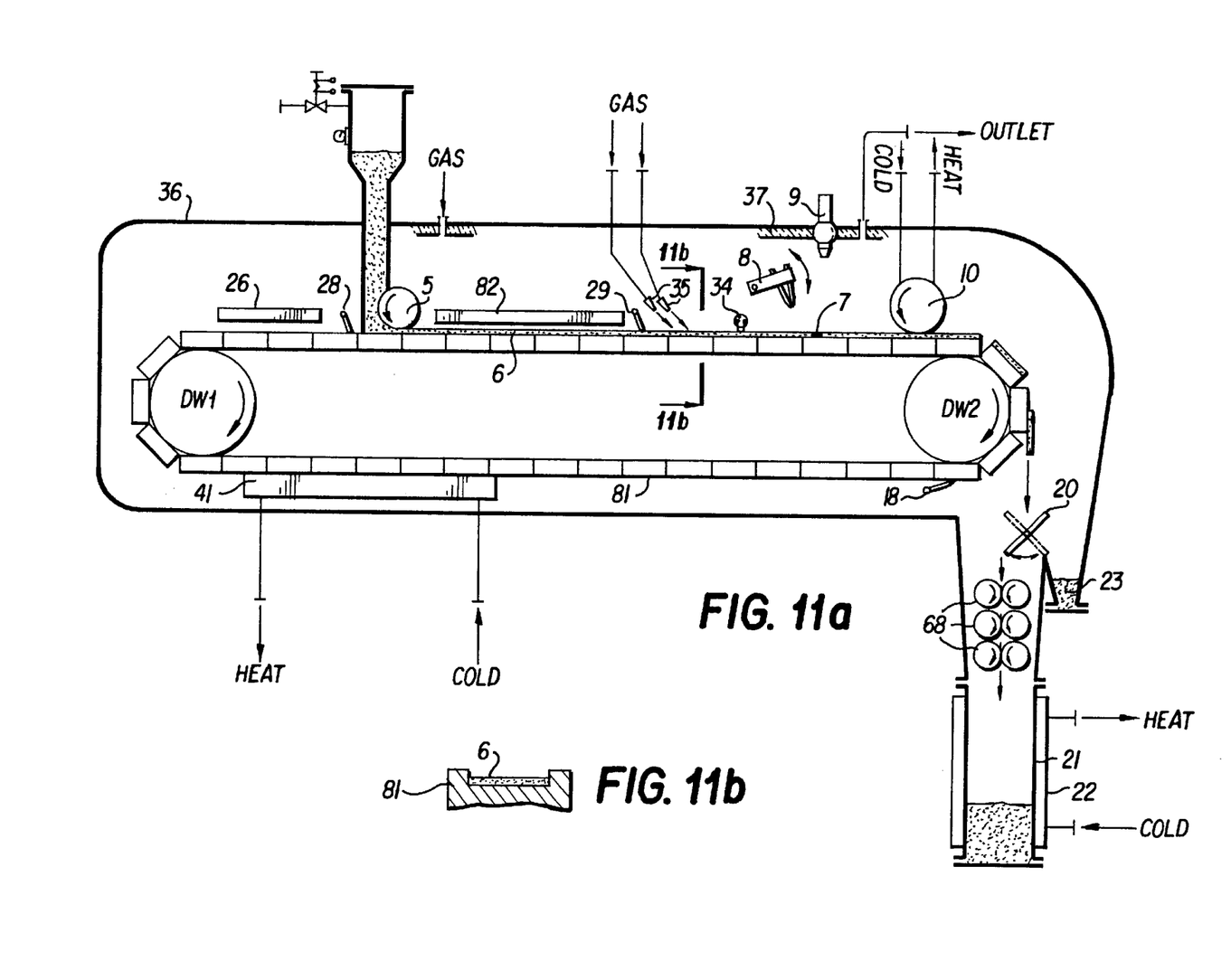
FIG. 11 shows an embodiment of the SHS reactor employing a conveyor instead of a drum.

In FIG. 11 is shown a chain conveyor 81 mounted within the chamber and continuously driven between driving wheels DW1, DW2.

The rest of the elements shown in FIGS. 10,11 are similar to those designated by the similar numerals in the previously explained main embodiment.

One of the advantages associated with the last embodiments is the possibility to increase the distance between rolls 5,10 and thus to expand the region with the combustion zone without however to amplify the whole size of the apparatus.

Within the expanded region immediate before the combustion zone it is possible to dispose, for example a dedicated heating means 82 for heating low exothermic charge mixture. By virtue of this provision, one can broaden the assortment of compounds, which one can synthesize in the apparatus of the invention.

Figure 12:
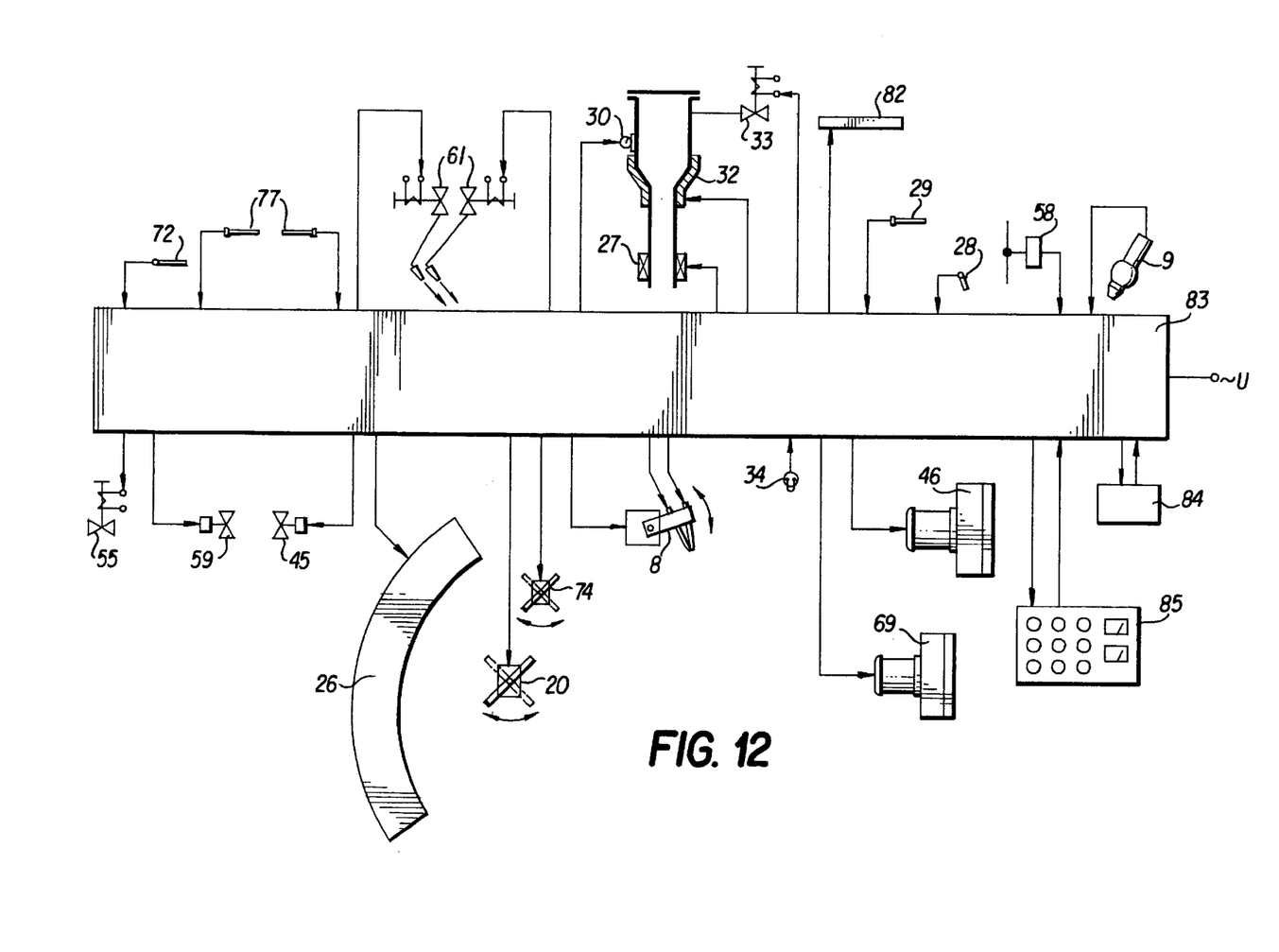
FIG. 12 shows control schematics of the SHS reactor of the present invention.

Referring now to FIG. 12 a block diagram of the automatic and control system will be explained in more details. This system comprises a main control block 83, an emergency source of energy 84 and a control panel 85. For the rest of the components the same numerals as in FIGS. 1–11 are used. Connected to the main block are monitoring means 9, temperature sensors 28,29, sensor 34 of the extinguishing system, pressure sensor 58 of the gas supply system, level sensors 72,22, igniter 8, butterfly selector valves 20,74, heaters 26,27,32,82, vibrator 30, valves 33,55,61,45,59, drives 46,69, emergency source of energy 84 and control panel 85.

Figures 13A, 13B:
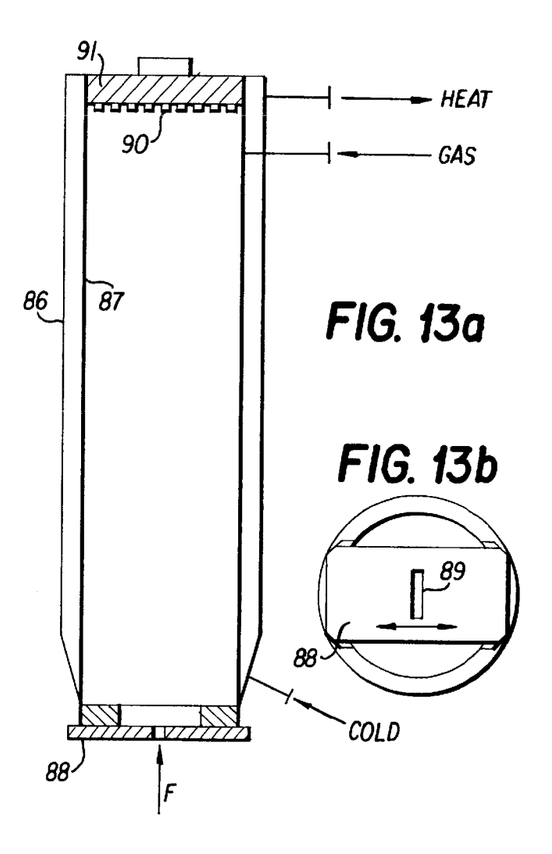
FIG. 13 refers to a monitoring means.

With reference to FIG. 13 the monitoring means will be disclosed. This means comprises a tubular housing 86, having central longitudinal axis. The housing is, surrounded by a cooling jacket 87. Secured on the lowermost extremity of the housing is a plank 88 having slit like aperture 89. Within the uppermost extremity of the hosing resides an array 90 of multiplicity of photodiodes, residing on a supporting substrate 91, made of dielectric material.

The monitoring means operates as follows. Light beam, associated with the combustion front is focused by the apertures and exposes at least one photodiode. Once the combustion front displaces with respect to the longitudinal axis the associated light beam will expose successively the adjacent photodiodes of the array. The automatic system, shown in FIG. 12 receives the signals generated by the individual photodiodes and controls the rotation velocity of the drive 46 and so of the drum 4 in accordance with the amplitude of the signal generated by the particular photodiode. The monitoring system is adjusted in such a manner, that if the central photodiode a signal is generated, which keeps the linear velocity of the drum's surface equal to the velocity of combustion of the layer 6, situated on the surface of the drum. Any displacement of the light beam towards the most right or the most left photodiode is associated respectively with increase or decrease of the rotation velocity of the drum. Plank 88 can be displaced with regards to the central axis and be secured in the desired position. By virtue of this provision a variation of the distance between the combustion front and roller 10 is possible. The suitable distance is selected in accordance with the synthesized material. To prevent photodiodes from overheating and to eliminate clogging of the aperture by the charge, expelled from the combustion zone a protection gas can be delivered inside the housing. The protection gas should match the composition of the atmosphere within the reactor chamber. Alternative embodiment of the monitoring system is possible. For example instead of photodiodes one can employ two thermocouples, located laterally above the layer 6. Once the combustion front approaches one of the thermocouples or departures therefrom a signal is generated by the automatic system, which controls the rotation velocity of the drum.

Now some basic functioning modes of the apparatus will be explained.

1. Initial mode

An initiation signal generated from the control panel opens valve 33 and 55. A cleaning gas from the pressurized source 60 fills the chamber to expel the air therefrom. Valve 33 closes and drive 46 starts operation together with the drive 69 (if available). The butterfly selector valve 20 is in the position to direct the charge mixture into reject collecting receptacle 23 and vibrator 30 is turned on. The layer of the charge mixture advanced by the forwarding means (drum, disk table or conveyor) approaches the combustion zone 7, gets ignited and the combustion reaction is establishes. After certain period of time, when that part of the charge mixture, which did not participate in the combustion reaction approaches receptacle 23, the selector valve is switched to direct the ready synthesized product into receptacle 21. The ready product is collected and cooled in the receptacle 21.

In those cases when within the SHS reaction requires vacuum instead of gas, valves 33,59 and 66 are closed and vacuum pump 63 generates vacuum. After the required vacuum is reached as detected by gauge 67, the reactor chamber is put into operation. Upon completing the run valve 66 opens and the vacuum is terminated.

2. Operating mode

During this stage the monitoring means and automatic system control the drive 46 to keep the feed rate of the charge mixture substantially equal to the combustion rate. The automatic system controls the drive in such a manner, that the feed rate increases or reduces if the combustion rate respectively increases or diminishes.

3. Final mode

Upon complete consumption of the charge mixture the combustion reaction terminates. Once this event is detected by monitoring means 9 the automatic system switches selector valve 20 to direct into receptacle 23 the remaining charge mixture, which did not undergo combustion reaction.

If drive 69 is available, it switches off automatically.

Once the ready product in receptacle 21 is cooled, drive 46 switches off, valve 55 closes and gas is not supplied any more within the chamber. A signal is generated on the control panel advising that the ready product can be collected from the receptacle 21.

4. Emergency mode

In the case of emergency, when supply of energy suddenly terminates, the automatic system is energized by the autonomous source 84, which is connected to the main supply and in the normal condition is charged thereby.

In the case of emergency, the automatic system performs the following:

Switches butterfly selector valve 20 to direct the ready product into receptacle 23

Switches drive 46 in the mode, in which the feed rate increases dramatically to direct the flame into receptacle 23

Switches drive 69 (if available) off

Switches heating means off

Generates on the control panel a signal advising about the break of voltage

Switches drive 46 off

Closes valve 55 after the product in receptacle 21 has cooled.

5. Extinguishing mode

This stage is also associated with emergency, e.g. when drive 46 fails and the forwarding means stops. In this situation, combustion front expands beyond the combustion zone towards feeding conduit 3 and receptacle 2 and it might be associated with inflammation of the charge mixture and failure of the whole apparatus. This situation can be detected by sensor 34 once the combustion front reaches the feeding conduit. To prevent this situation the extinguishing system performs the following:

Opens valve 61 to enable supply of gas under pressure from source 53 through duct 62 to nozzles 35. The gas flow destroys the layer of the charge mixture and thus prevents further expansion of the flame Switches drives 46, 69 (if available) off Switches heating means off Generates on the control panel a signal advising about the emergency situation Closes valve 55 after the product in receptacle 21 has cooled.

6. Synthesizing mode for high exothermic charge mixtures

In this mode, the automatic system controls temperature of heating means 26 and flow rate of the cooling agent passing through the cooling jackets 41. For this purpose is employed temperature sensor 28 and control valve 45. The automatic system maintains the temperature of the forwarding means below some pre-selected threshold or below the temperature at which inflammation of the charge mixture can occur.

7. Synthesizing mode for low exothermic charge mixtures

In this mode, the automatic system controls temperature of the charge mixture within the feeding conduit, temperature of heating means 26 and flow rate of the cooling agent passing through the cooling jackets 41. For this purpose are employed temperature sensors 28,29 and control valve 45. The automatic system maintains the temperature of the forwarding means below some pre-selected threshold.

8. Synthesizing mode with the use of a reactant gas

In this mode, the automatic system controls temperature of the heating means as well of the flow rate of the cooling agent, passing through the cooling jackets and maintains required pressure within the reactor chamber. For this purpose are employed pressure sensor 58 and proportional valve 59.

9. Drying mode

If required the moist charge mixture can be dried within the feeding receptacle 2 by virtue of dedicated heating means 32, which switches on upon generation of appropriate signal from the control panel and opening valve 33. The particular time, which is required for drying is established empirically for each particular charge mixture.

Now the invention will be explained with reference to a non-limiting example 1 below.

EXAMPLE 1

In the apparatus of the invention as shown in FIGS. 1–7 were successfully synthesized the following compounds:

Simple carbides TiC, NbC, TaC

Complex carbides TaC/NbC, TiC/WC

Silicides $MoSi_2$, $Ti_5Si_3$

Nitride TiN

Aluminide NiAl.

The main parameters of the reactor chamber were as follows:

Drum outside diameter—300 mm

Thickness Δ of the charge mixture layer—2.5–3 mm

Thickness Δ of the charge mixture layer for synthesizing of TiN—1 mm

Width of the charge mixture layer—34 mm

Capacity of the apparatus during synthesizing of TiC—7 kg/hr

Consumed power (without heating means)—0.2 kW

Mass of the apparatus—150 kg

Length of the apparatus—950 mm

Width of the apparatus—630 mm

Height of the apparatus—1850 mm.

It should be appreciated that the present invention is not limited to the above-described embodiments and that changes and one skilled in the art can make modifications ordinarily without deviation from the scope of the invention, as will be defined in the appended claims.

It should also be appreciated that the features disclosed in the foregoing description, and/or in the following claims, and/or in the accompanying drawings may, both separately and in any combination thereof, be material for realizing the present invention in diverse forms thereof.

What is claimed is:

1. An apparatus for self-propagating high temperature synthesis of an inorganic compound from a combustible charge mixture of initial ingredients, said apparatus comprising i) a feeding receptacle for storing the charge mixture therein, said feeding receptacle being in communication with ii) a closed reaction chamber, enclosed by a hot-insulated cylindrical housing provided with an inlet opening for entering the charge mixture thereinto, a combustion zone provided with igniting means for igniting the charge mixture to establish self-sustaining combustion reaction between the initial ingredients, an outlet opening for discharging a synthesized compound from the housing, said reactor chamber is provided with a forwarding means, which is mounted in the housing to be driven by a drive, said forwarding means is capable to advance continuously the charge mixture towards the combustion zone and to draw the charge mixture therethrough, said forwarding means is situated within the housing in such a manner that the charge mixture deposits on the forwarding means substantially as a layer displaceable by the forwarding means, when it is driven;

iii) monitoring means for monitoring the current location of a combustion front established during said combustion reaction and to detect when said combustion front expands beyond the combustion zone;

iv) extinguishing means for terminating the combustion reaction substantially automatically when the combustion front expands beyond the combustion zone;

v) retaining means for preventing said layer from separating from the forwarding means;

vi) compacting means for compacting said layer before it enters the combustion zone; and vii) comminuting means for disintegrating the layer after it has passed the combustion zone and to convert it into particulate synthesized compound.

2. The apparatus as defined in claim 1, in which said forwarding means comprises a main drum, defined by its cylindrical peripheral surface and by two opposite butt ends, said main drum is located within the housing in such a manner, that the charge deposits on the said peripheral surface.

3. The apparatus as defined in claim 2, further comprising at least one scraping means for separating the smelted synthesized compound from the cylindrical peripheral surface of the main drum.

4. The apparatus as defined in claim 2, further comprising heating means for heating at least part of the peripheral surface of the main drum, before the charge mixture resides thereonto.

5. The apparatus as defined in claim 2, in which said retaining means comprises a roll situated beyond the combustion zone, said roll is mounted above the peripheral surface of the main drum with possibility for rotation, said roll is separated from the peripheral surface of the main drum by a distance, which is less than the thickness of the layer passing the combustion zone, said roll is resiliently pressed towards the said peripheral surface to prevent separation of the layer therefrom.

6. The apparatus as defined in claim 5, in which said comminuting means comprises at least one wheel, said wheel is mounted with possibility for rotation, said wheel is situated beyond the retaining means and above the peripheral surface of the main drum, said wheel is mounted with possibility to exert pressure on the layer of synthesized compound to disintegrate thereof.

7. The apparatus as defined in claim 1, in which said feeding receptacle is provided with a heating means for heating the charge mixture before it enters the housing.

8. The apparatus as defined in claim 7, in which said feeding receptacle is provided with a shaking means for applying vibration to the charge mixture and with a valve means for evacuating the moisture therefrom.

9. The apparatus as defined in claim 1, further comprising gas supply means for supplying of at least one reactant gas as required for synthesizing the synthesized compound and said housing is formed with at least one additional inlet opening for said reactant gas immediate to the combustion zone and means for evacuating residual gas products generated during the combustion reaction.

10. The apparatus as defined in claim 1, further comprising blowing means for cleaning the interior of the reactor chamber by blowing a cleaning gas therethrough.

11. The apparatus as defined in claim 1, further comprising vacuum means for vacuuming the reactor chamber.

12. The apparatus as defined in claim 1, in which said housing is provided with at least one window for visual observation of the interior of the reactor chamber.

13. The apparatus as defined in claim 1, further comprising decontaminating means for preventing contamination of the synthesized compound by particles of the charge mixture escaping from the combustion zones, said decontaminating means comprises a tray for directing said particles to a collecting receptacle.

14. The apparatus as defined in claim 1, in which said extinguishing means comprises at least one nozzle mounted above the combustion zone, said nozzle is in communication with a source of pressurized, preferably inert gas.

15. The apparatus as defined in claim 1, in which said compacting means comprises a roll mounted above the peripheral surface of the main drum to apply pressure on the charge mixture and to compact thereof before it enters the combustion zone.

16. The apparatus as defined in claim 1, further comprising shielding means for distributing the charge mixture on the forwarding means as a layer with homogeneous and controllable thickness.

17. The apparatus as defined in claim 1, further comprising a receptacle for collecting the charge mixture which did not undergo the combustion reaction and a selector valve adapted either to direct the charge mixture which did not undergo the combustion reaction to said receptacle or to direct the disintegrated synthesized compound to the outlet opening.

18. The apparatus as defined in claim 1, in which said forwarding means comprises a disk table suitable for depositing of the charge mixture thereon.

19. The as defined in claim 1, in which said forwarding means comprises a conveyer, suitable for depositing of the charge mixture thereon.

20. An apparatus for self-propagating high temperature synthesis of an inorganic compound from a combustible charge mixture of initial ingredients, said apparatus comprising i) a feeding receptacle for storing the charge mixture therein, said feeding receptacle being in communication with ii) a closed reaction chamber, enclosed by a hot-insulated cylindrical housing provided with an inlet opening for entering the charge mixture thereinto, a combustion zone provided with igniting means for igniting the charge mixture to establish self-sustaining combustion reaction between the initial ingredients, an outlet opening for discharging a synthesized compound from the housing, said reactor chamber is provided with a forwarding means, which is mounted in the housing to be driven by a drive, said forwarding means is capable to advance continuously the charge mixture towards the combustion zone and to draw the charge mixture therethrough, said forwarding means is situated within the housing in such a manner that the charge mixture deposits on the forwarding means substantially as a layer displaceable by the forwarding means, when it is driven;

iii) monitoring means for monitoring the current location of a combustion front established during said combustion reaction and to detect when said combustion front expands beyond the combustion zone;

iv) extinguishing means for terminating the combustion reaction substantially automatically when the combustion front expands beyond the combustion zone;

v) retaining means for preventing said layer from separating from the forwarding means;

vi) comminuting means for disintegrating the layer after it has passed the combustion zone and to convert it into particulate synthesized compound; and vii) decontamination means for preventing contamination of the synthesized compound by particles of the charge mixture escaping from the combustion zone, said decontamination means is formed as a tray for directing said particles to a collecting receptacle.

21. An apparatus for self-propagating high temperature synthesis of an inorganic compound from a combustible charge mixture of initial ingredients, said apparatus comprising i) a feeding receptacle for storing the charge mixture therein, said feeding receptacle being in communication with ii) a closed reaction chamber, enclosed by a hot-insulated cylindrical housing provided with an inlet opening for entering the charge mixture thereinto, a combustion zone provided with igniting means for igniting the charge mixture to establish self-sustaining combustion reaction between the initial ingredients, an outlet opening for discharging a synthesized compound from the housing, said reactor chamber is provided with a forwarding means, which is mounted in the housing to be driven by a drive, said forwarding means is capable to advance continuously the charge mixture towards the combustion zone and to draw the charge mixture therethrough, said forwarding means is situated within the housing in such a manner that the charge mixture deposits on the forwarding means substantially as a layer displaceable by the forwarding means, when it is driven;

iii) monitoring means for monitoring the current location of a combustion front established during said combustion reaction and to detect when said combustion front expands beyond the combustion zone;

iv) extinguishing means for terminating the combustion reaction substantially automatically when the combustion front expands beyond the combustion zone;

v) retaining means for preventing said layer from separating from the forwarding means;

vi) comminuting means for disintegrating the layer after it has passed the combustion zone and to convert it into particulate synthesized compound; and vii) a receptacle for collecting the charge mixture which did not undergo the combustion reaction and a selector valve adapted either to direct the charge mixture which did not undergo the combustion reaction to said receptacle or to direct the disintegrated synthesized compound to the outlet opening.

22. An apparatus for self-propagating high temperature synthesis of an inorganic compound from a combustible charge mixture of initial ingredients, said apparatus comprising i) a feeding receptacle for storing the charge mixture therein, wherein the feeding receptacle comprises a shaking means for applying vibration to the charge mixture and a valve means for evacuating the moisture therefrom, said feeding receptacle being in communication with ii) a closed reaction chamber, enclosed by a hot-insulated cylindrical housing provided with an inlet opening for entering the charge mixture thereinto, a combustion zone provided with igniting means for igniting the charge mixture to establish self-sustaining combustion reaction between the initial ingredients, an outlet opening for discharging a synthesized compound from the housing, said reactor chamber is provided with a forwarding means, which is mounted in the housing to be driven by a drive, said forwarding means is capable to advance continuously the charge mixture towards the combustion zone and to draw the charge mixture therethrough, said forwarding means is situated within the housing in such a manner that the charge mixture deposits on the forwarding means substantially as a layer displaceable by the forwarding means, when it is driven;

iii) monitoring means for monitoring the current location of a combustion front established during said combustion reaction and to detect when said combustion front expands beyond the combustion zone;

iv) extinguishing means for terminating the combustion reaction substantially automatically when the combustion front expands beyond the combustion zone;

v) retaining means for preventing said layer from separating from the forwarding means; and vi) a comminuting means for disintegrating the layer after it has passed the combustion zone and to convert it into particulate synthesized compound.

* * * * *